C. T. BELL.
TROLLEY POLE HEAD.
APPLICATION FILED AUG. 9, 1919. RENEWED MAR. 30, 1921.
1,378,991.
Patented May 24, 1921.
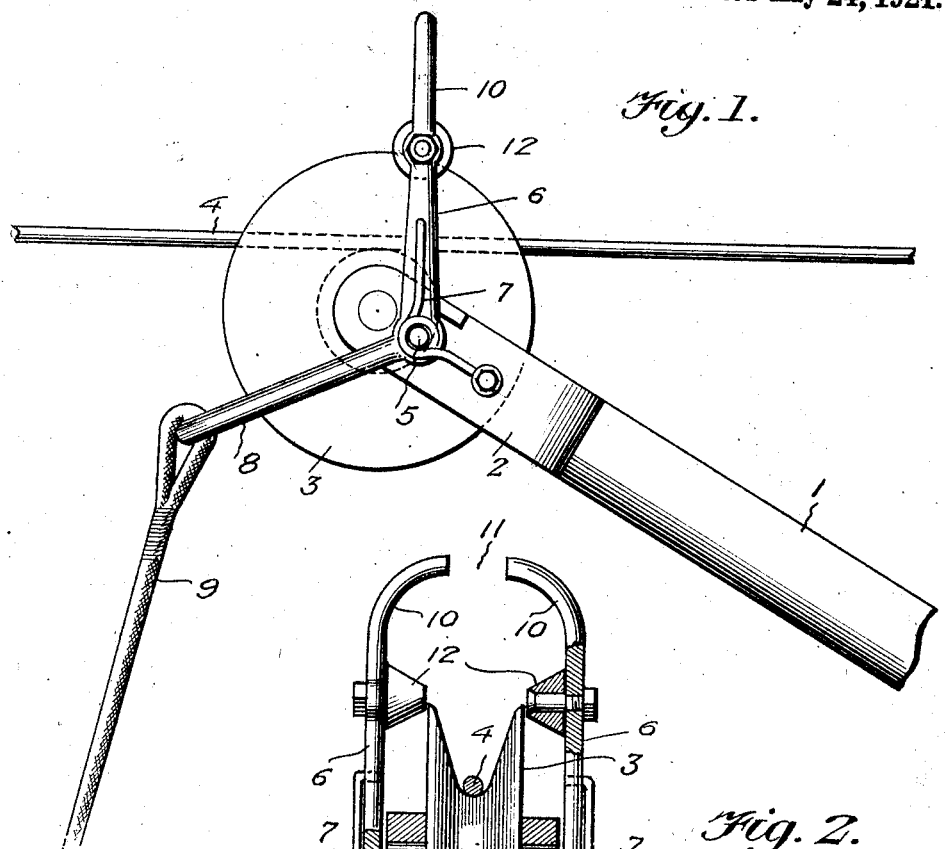
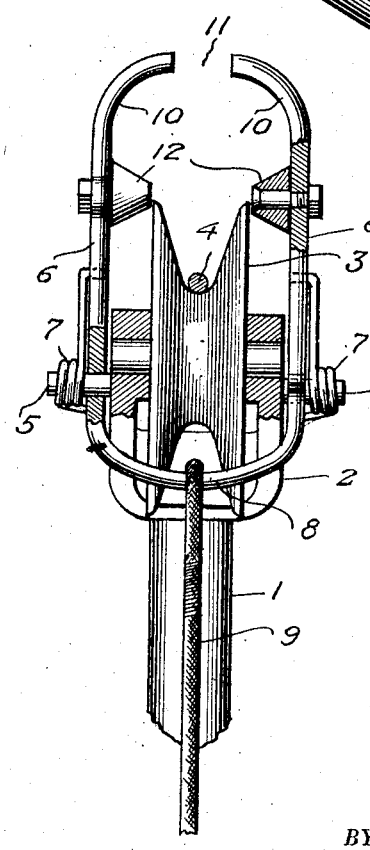
George T. Bell
INVENTOR.
BY
Victor J. Evans
ATTORNEY.

UNITED STATES PATENT OFFICE.

GEORGE TRAFFORD BELL, OF BOSTON, MASSACHUSETTS, ASSIGNOR, BY MESNE ASSIGN-
MENTS, TO J. F. C. McCARTHY, OF BOSTON, MASSACHUSETTS.

TROLLEY-POLE HEAD.

1,378,991.   Specification of Letters Patent.   Patented May 24, 1921.

Application filed August 9, 1919, Serial No. 316,377. Renewed March 30, 1921. Serial No. 457,027.

*To all whom it may concern:*

Be it known that I, GEORGE T. BELL, a citizen of the United States, residing at Boston, in the county of Suffolk and State of Massachusetts, have invented new and useful Improvements in Trolley-Pole Heads, of which the following is a specification.

The object of my present sole invention is the provision of a trolley pole head constructed with a view to facilitating the replacing of the contact wheel in engagement with a trolley wire, in the event of the contact wheel being casually disengaged from said wire.

To the attainment of the foregoing, the invention consists in the improvement hereinafter described and definitely claimed.

In the accompanying drawings, hereby made a part hereof:

Figure 1 is a side elevation illustrative of my improvement.

Fig. 2 is a view, partly in section and partly in elevation, taken at right angles to Fig. 1.

Similar numerals of reference designate corresponding parts in both views of the drawings.

At its upper end the trolley pole 1 is provided with a bifurcated head 2, and in the bifurcation of the head is mounted to revolve the circumferentially grooved contact wheel 3 for engaging the trolley wire, indicated by 4.

In furtherance of my invention, the head 2 is equipped with lateral journals 5, and fulcrumed on said journals 5 are the side portions 6 of a guard; the said guard being yieldingly maintained in the relative position illustrated through the medium of side springs 7.

In addition to the side portions 6, which are preferably of obtuse angle formation, Fig. 1, the guard comprises a lower bight 8 for the connection of the usual manipulating cables 9, inwardly-reaching end arms 10 separated by a gap 11 for the arrangement of the contact wheel 3 in engagement with the trolley wire 4, and anti-friction rollers 12, preferably of frusto-conical shape, which are carried at the inner sides of the side portion 6 adjacent to the upper ends thereof and have their inner ends arranged in close proximity to the sides of the peripheral portion of the contact wheel 3, Fig. 2.

As is well known, much annoyance is occasioned by contact wheels of trolleys jumping out of engagement with trolley wires, and much difficulty is experienced and time lost in the replacing of trolley wheels in proper working engagement relatively to trolley wires.

By virtue of my improvement, when the contact wheel 3 becomes disengaged from the trolley wire, the chances are very much in favor of one of the inwardly directed arms 10 engaging the trolley wire, so that one of the rollers 12 will be guided into engagement with the wire, and will facilitate the subsequent engagement of the contact wheel 3 with the wire, and this without subjecting the guard to undue wear against the trolley wire.

When the guard is entirely clear of the trolley wire, and it is desired to place the wheels 3 in working contact against the wire, it is simply necessary as a condition precedent to the operation before described, to so manipulate the trolley pole that the trolley wire will pass through the gap 11 to a position within the upper arms of the guard.

Having described my invention, what I claim and desire to secure by Letters-Patent, is:

1. The combination with a trolley pole of a contact wheel carried thereby, guard arms fixed against lateral movement at opposite sides of said wheel, resilient means maintaining said arms in upstanding position, said arms having fixed inwardly-extending upper end portions disposed above said wheel, said end portions being normally out of contact with the trolley wire and separated by a gap sufficiently wide to permit said wire to pass therethrough, and inwardly-extending lateral portions arranged in close proximity to said wheel at the periphery thereof, means for pivotally connecting said arms at their lower ends to opposite sides of the trolley pole and a member joining said arms together, said member being arranged for the connection of a manipulating cable.

2. The combination with a trolley pole having a harp at its outer end of a contact wheel rotatably mounted in said harp, guard arms fixed against lateral movement and pivotally connected to said harp, resilient means for maintaining said arms in upstanding position, said arms having fixed inwardly-extending end portions disposed above said wheel, said end portions being normally out of contact with the trolley wire and separated by a gap sufficiently wide to permit said wire to pass therethrough, and inwardly-extending lateral portions arranged in close proximity to the opposite sides of said wheels at the periphery thereof, and means whereby said arms may be rotated manually about their connections with said harp and thereby bring said inwardly-extending upper end portions of said arms below the periphery of the upper part of said contact wheel.

In testimony whereof I affix my signature.

GEORGE TRAFFORD BELL.